Nov. 8, 1927.  
T. HUGO  
1,648,768  
MANUFACTURE OF ENVELOPES  
Filed April 24, 1925   13 Sheets-Sheet 1

Inventor  
Theodor Hugo,

Nov. 8, 1927.  
T. HUGO  
1,648,768  
MANUFACTURE OF ENVELOPES  
Filed April 24, 1925  
13 Sheets-Sheet 6

Inventor  
Theodor Hugo,  
by  
Attorney

Nov. 8, 1927. 1,648,768
T. HUGO
MANUFACTURE OF ENVELOPES
Filed April 24, 1925    13 Sheets-Sheet 7

Inventor
Theodor Hugo,
by Omro L. Norris
Attorney

Nov. 8, 1927. 1,648,768
T. HUGO
MANUFACTURE OF ENVELOPES
Filed April 24, 1925   13 Sheets-Sheet 8

Inventor
Theodor Hugo,
by
Attorney

Nov. 8, 1927. 1,648,768

T. HUGO

MANUFACTURE OF ENVELOPES

Filed April 24, 1925 13 Sheets-Sheet 10

Inventor
Theodor Hugo,

Attorney

Nov. 8, 1927.  1,648,768
T. HUGO
MANUFACTURE OF ENVELOPES
Filed April 24, 1925   13 Sheets-Sheet 13

Inventor
Theodor Hugo,
Attorney

Patented Nov. 8, 1927.

1,648,768

UNITED STATES PATENT OFFICE.

THEODOR HUGO, OF WILMERSDORF, NEAR BERLIN, GERMANY.

MANUFACTURE OF ENVELOPES

Application filed April 24, 1925, Serial No. 25,641, and in Germany March 11, 1925.

Processes and apparatus are known for manufacturing lined envelopes, paper bags or the like, and also window or inspection envelopes, provided with linings of transparent paper, in which, by means of plungers carrying adhesive material, or by suction devices, a lining or window blank is raised from a pile of blanks, and then conveyed and caused to adhere to a previously formed and gummed outer covering blank lying on another pile of blanks, whereupon the two blanks are conveyed together to a folding device of known kind and the further operations for finishing the envelope (gumming, folding, drying and so on) are effected.

Envelopes provided with silk or metal paper linings were manufactured on machines, for example circular machines, in which a vertical intermittently rotating shaft was provided with arms and gummers which lifted the blanks and conveyed away the lining and the outer covering blanks.

Machines are also known in which similarly the two blanks are stuck together by gummers moving in a straight line instead of in a circular path, and in which the double blank is led to the folding device either in the same direction as the lining blank was led to the pile of cover blanks, or in path at right angles to the former direction.

These types of machines have the drawback that the lining blanks must have an under flap to which they are fastened by the gummer, lifted from the pile of blanks, and led to the outer cover blank, since otherwise the gum carried by the gummer may be applied to inner parts of the outer or cover blank and would on folding cause these to adhere to the side flaps and prevent the insertion of the letter sheet.

It has also been proposed to make the lining of very valuable material (metallic paper, silk paper, often embossed and ornamented and so on) in order to give the lined covering a more pleasing appearance. On account of the high cost of this lining, it should be economized at those parts of the folded cover at which the lining is not visible, and for this purpose in the first place the under flaps of the lining should be omitted (leaving what is herein called a partial lining). Since in the formerly known devices, the lining or covering blanks of the envelope were gummed by gummers in the same working process with the folding, gumming, drying and so on, their use in the manufacture of lined envelopes without under flaps (partial lining) is excluded for the above-mentioned reasons. Such envelopes were formerly manufactured by the use of a separate machine which only joined together the lining and outer blanks, after which they were gummed, folded and closed down in an envelope machine of known type.

This inconvenient and inefficient working process is replaced and also the use of two different machines is obviated by the arrangement constituting my invention and in which the envelopes with partial linings are manufactured by the use of co-operating suction operated gripping and gumming devices, for example, by a circular suction envelope machine or by one in which the blanks are fed rectilinearly, in a single working process which includes the sticking of the lining, the gumming of the folding flaps, the folding, sticking, drying and other operations for finishing the envelope. The lining blank which is the uppermost at any time of a pile of blanks is lifted by air suction, and is held in its circular or rectilinear path by a gripping device until it has been joined in the correct position to an outer covering blank which has been suitably gummed and placed on a pile of blanks at a certain distance from the pile of lining blanks. The combined blanks are lifted by the adhesion produced by a gummer which travels with them in the feeding path. The combined blanks are then conveyed to a folding device, also placed in the feeding path of the blanks, the upper plunger of which inserts them in a folding box, following the release of suction, and a hook shaped gripper released, or the blanks ejected from the gummer.

This process is carried out on machines which without reducing the efficiency as compared with the usual circular suction envelope machines, manufacture finished envelopes lined with partial linings or with window sheets in a single working process.

For example, in a circular envelope machine of known type suction arms are attached to the upper end of a vertical intermittently rotated main shaft and, in the position of their rotation in which they are temporarily stationary over the pile of lining blanks, come under the action of an air pump. The lining blank, which at that time is on the top of the pile, is raised therefrom and is held to the arm by a hook shaped gripper. The blank is held until it arrives at the folding device and is then released from the gripper. In the meantime the arm with the lining or covering blank arrives at the pile of outer cover blanks and remains stationary over it. At this time the gummer for the outer blanks, which is attached to the suction arms at a definite distance from the suction device, comes into action. The arm descends on to the pile of cover blanks, seizes the uppermost blank and removes it and the lining blank during the subsequent ascent of the arm. Thereupon the arm rotates with the two blanks after they have been gripped and gummed to the folding device where the blanks are released from the arm by means of plungers and suitably arranged stops which open the gripper, the suction having been previously cut off. The two blanks are laid on, and pushed into, the folding box by an upper plunger, and in known manner are folded, gummed and the like to form the finished envelope. Simultaneously with the above described process, the adhesive material is supplied to the under surface of the rotating gummer for gumming the lower flap, the closing flap, and also the inner side of the outer blank for sticking the lining blank.

In another type of machine according to the invention for the manufacture of envelopes, paper bags or the like with partial linings or with windows or inspection linings of transparent paper, the conveyance of the lining blanks or combined lining and outer cover blanks from their piles to the folding device is effected in a rectilinear instead of in a circular path.

In this machine the top blank of the pile is lifted, for example by a suction device as previously described, and seized by a hook-shaped gripper and is led to the pile of outer sheets in a rectilinear path, whereupon the suction device returns to its original position at the pile of lining blanks.

In the meantime the inner side of the outer sheet which is lying on the top of the pile is provided with adhesive material for closing the flap and with a supply of adhesive material for fastening the lining. The closing flap gummer traverses the same path as the suction device for the lining blank, but the gripping and feeding mechanism of the two devices are distinct, since although their movements are in the same direction, they return through paths of different length. Above the path of the suction device for the lining blanks and the closing flap gummer a second path is provided on which slides the gumming device, which conveys the adhesive material necessary for sticking the lining blank to the inner side of the outer sheet of the envelope. The two blanks, which are joined together on the pile of outer blanks, are now lifted by a gummer provided with a suction device reciprocating horizontally in an extension of the path of the lining blank, seized by a gripper of the above-mentioned type and conveyed to the folder in a rectilinear path in the same direction as the path traversed by the lining blank. The folding and the previous release of the paper blanks etc. take place in the manner described in connection with the circular envelope machine.

In a modification of the last described machine for making envelopes with partial linings, a gummer for the bottom flaps is moved on a horizontal slide arranged by the pile of outer blanks (on the opposite side to the pile of lining blanks) and at the same time a gummer for sticking the lining to the inner side of the outer blank. Also, in this case separate operating gears are employed, since the paths of the two devices, although in the same direction, are of different length. In this particular construction the double blank is led to the folder by grippers from the pile of outer blanks in a direction at right angles to the direction of movement of the lining blanks, and is there in known manner formed into the finished envelope. In this construction the lining blank is also lifted from the pile by air suction supported by a hooked gripper and the closing flap gummer is moved on the slide serving for the suction device.

The above described process and the different devices for carrying out the process are also useful in the manufacture of window or inspection envelopes which are made by sticking a transparent covering blank over a window opening formed in the outer blank. In this case, as well as in the manufacture of envelopes with partial linings, there is no need that an extension of the window blank (Pergamin paper or the like) shall project over the under flap of the envelope, as was formerly necessary in the manufacture of such envelopes on circular envelope machines, and there is also a considerable saving in the transparent window paper, while at the same time the output is considerably increased, since the window covering blanks which have to be conveyed and gummed are much smaller than those used in the manufacture of such envelopes in the known type of machines.

In the accompanying drawings which represent machines constructed according to the invention—

Figure 2ª is a front view thereof.

Figure 2ᵇ is a detail view of the rotary shaft drive.

Figs. 14ª and 14ᵇ are, respectively, an elevation and a plan view of the means for lifting the lining blanks by the suction arms with the aid of the gripping devices and a stationary suction device which is not moved with the suction arms.

Fig. 15ª is an elevation of the gripping device with the hooked arm in open position.

Fig. 17ª is a plan view of parts of the gripper.

Fig. 18ª is an elevation of a stripping device for preventing more than one blank from being lifted at the same time from the pile of lining blanks.

Figures 1, 4:
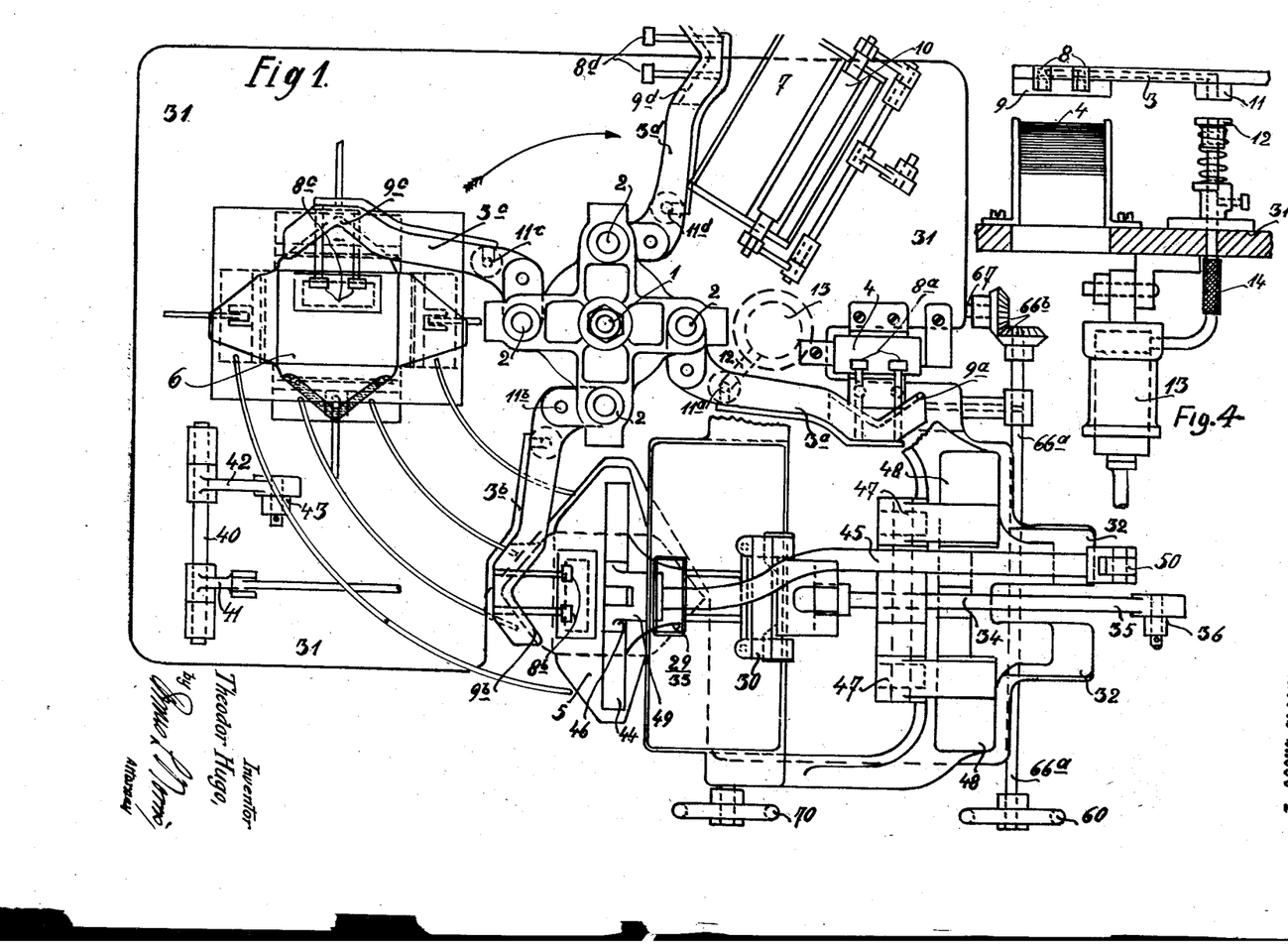
Fig. 1 is a plan view of a circular envelope machine constructed according to the invention.
Fig. 4 is a view, partly in elevation and partly in section, showing the air pump with the device for transmitting its suction action to the suction arms.
Figure 1A:
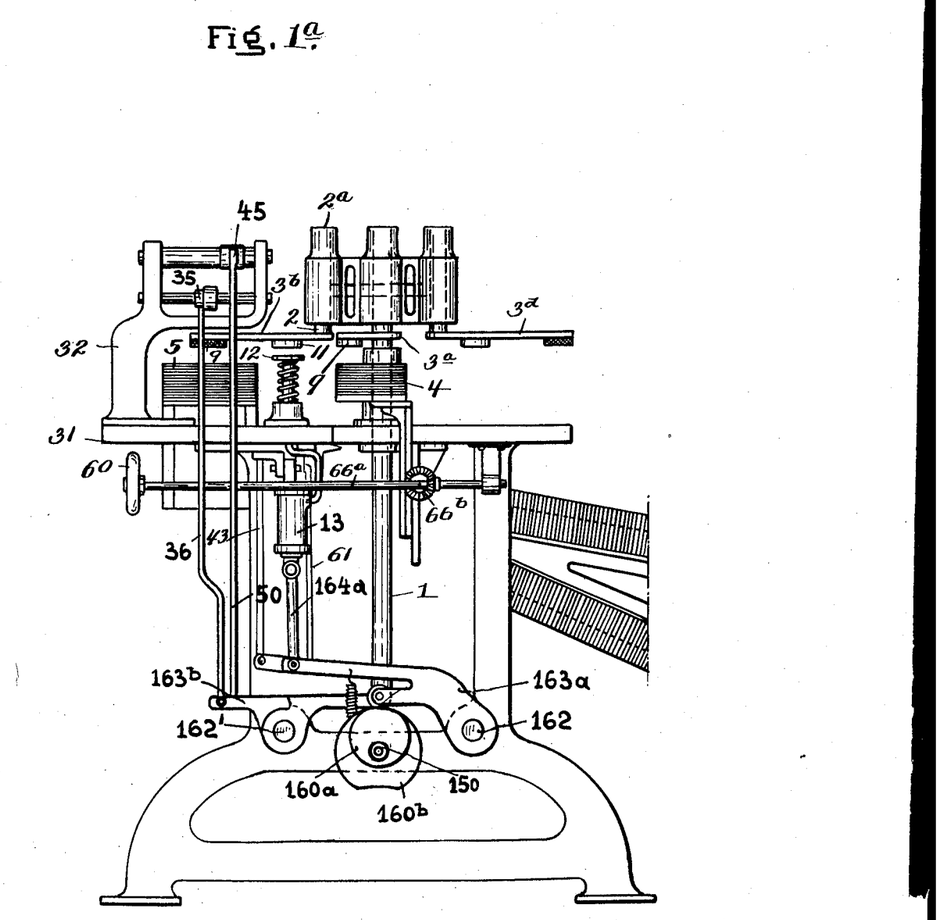
Figure 1a is an end elevation showing the circular machine in general with the drive shaft connections with the various mechanisms.
Figures 2, 3:
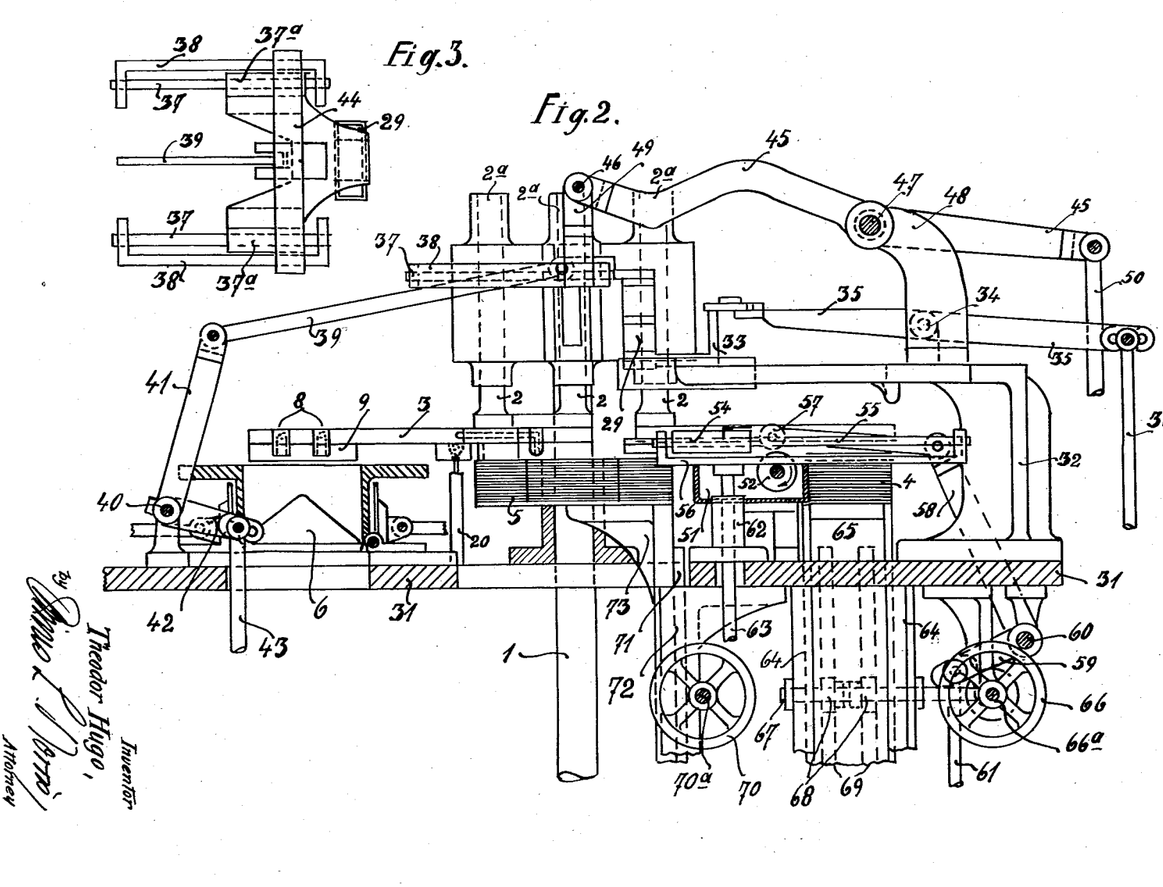
Fig. 2 is a view partly in section and partly in elevation of such machine and wherein the gummer for the lining blanks is shown in the raised position.
Fig. 3 is a plan view of the guide for the gummer for a window envelope.
Figure 2A:
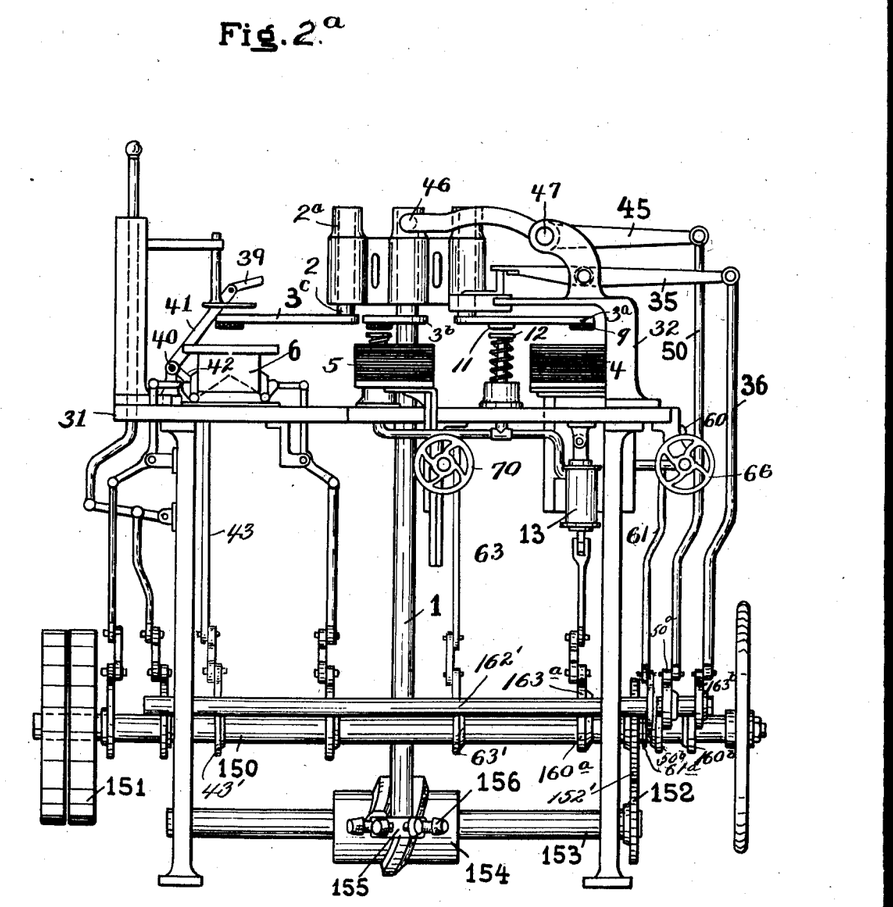
Figure 2B:
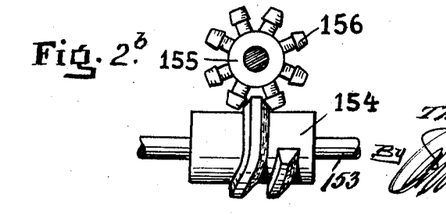

Referring to Figs. 1 and 2, suction arms 3ª, 3ᵇ, 3ᶜ and 3ᵈ are connected at their inner ends to guides 2 and 2ª and rotate intermittently in the direction shown by the arrow, about a vertical main shaft 1 of the circular envelope machine. This shaft 1, as illustrated in Figures 2ª and 2ᵇ, has the head 155 provided with the radial drive pins, 156, whose frusto-conical or taper bearings engage the cam spiral 154, mounted upon and rotatable with the shaft 153. The shaft 153 receives its motion from the main drive shaft 150 through the medium of the gears 152' or 152. The arms are temporarily stopped opposite the positions of the pile 4 of lining blanks, pile 5 of outer cover blanks, the folding device 6 and the gumming trough 7 which supplies adhesive material to gummers 9ª, 9ᵇ, 9ᶜ, and 9ᵈ for the under flaps. While the arms 3ª, 3ᵇ, 3ᶜ, and 3ᵈ are stationary in the positions just mentioned they are moved vertically downwards in their guides 2 and 2ª until an arm 3ª meets the uppermost blank of the pile 4 and an arm 3ᵇ meets the uppermost blank of the pile of outer cover blanks 5, and until the arm 3ᶜ is close to the upper surface of the folding box 6. At the end of the temporary halt the arms are raised in their guides 2 and continue their circular movement. The arms carry the suction tube nozzles 8ª—8ᵈ and also the gummers 9ª—9ᵈ, which latter during rotation of the arms slide over the gum troughs 7 and are there provided with adhesive material by rollers 10.

Figure 14:
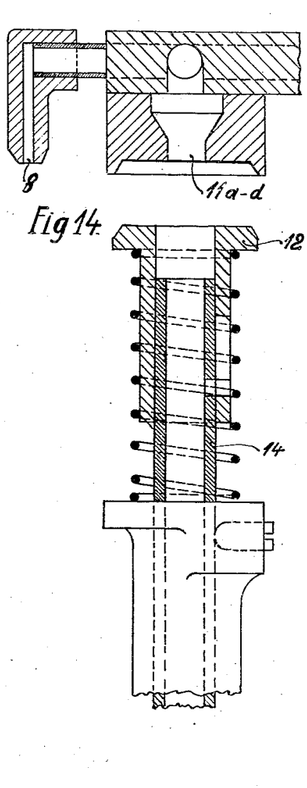
Fig. 14 is a view, partly in elevation and partly in section, showing the connections between the suction nozzles and the suction arm and between the air pump and the suction tube.
Figure 14A:
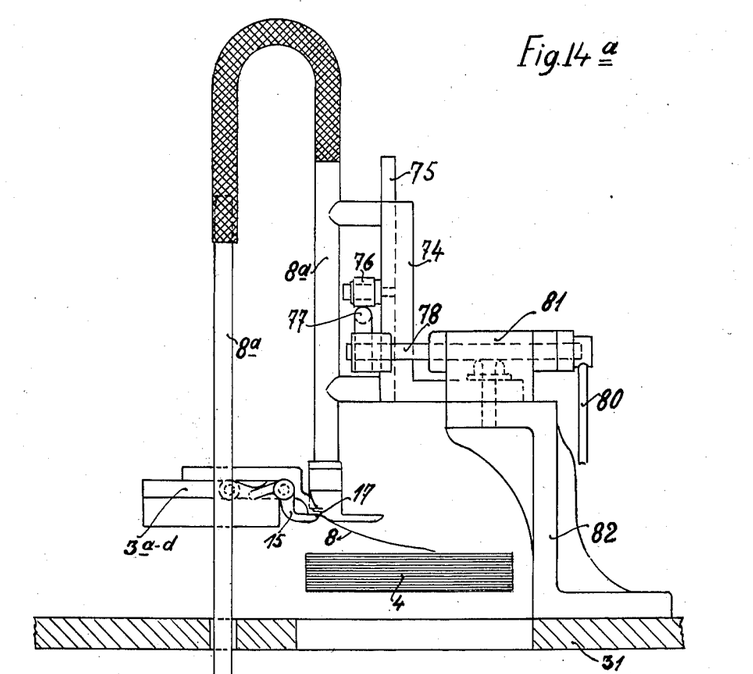
Figure 14B:
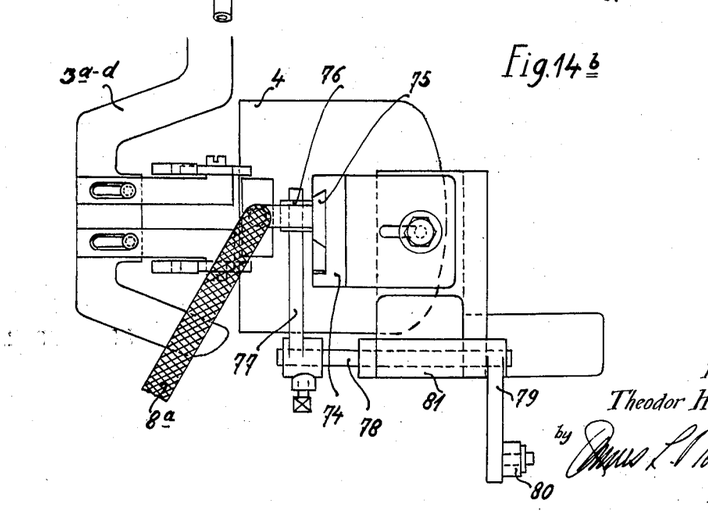

In the position of the arms shown in Fig. 1, arm 3ª is over the pile 4 of lining blanks and its air suction tube 11ª—11ᵈ (see also Figs. 7–14) comes into air-tight engagement during the descent of the arm 3ª with a coupling member 12 of the air pump 13 (see Figs. 4 and 14). The coupling member 12 is carried by a tube 14 communicating with the air pump 13 and slides vertically against a spring mounted on the tube 14, which spring yields to the pressure of the descending arm 3. At the moment that the air suction tube 11 contacts with the coupling member 12 the air pump 13 is actuated by means of the rod 164ª and the eccentric or cam 160ª on the main shaft 150 and lever 163ª journaled at 162 and transmits its suction action to the nozzles 8. The air pump action is transmitted from the pump 13 through the nozzles 8 to the uppermost sheet of the pile 4 which sheet is thereby raised and adheres to the nozzles until it is gripped by the hooked arm 15 of a gripping device 15—18 (Figs. 15–20). During the descent of the arm 3ª (the same process is repeated also by the arms 3ᵇ—3ᵈ when they arrive at position in which the arm 3ª is shown in Fig. 1, a pin 20 releases the hooked arm 15 (Fig. 17) which is pressed by a spring 16 against a cheek 17. Since the coupling member 12 slides up and down on the tube 14 the air-tight closure between the tube 11 and the member 12 remains until the gripping action of the device 15—20 is effected.

Figures 5, 6:
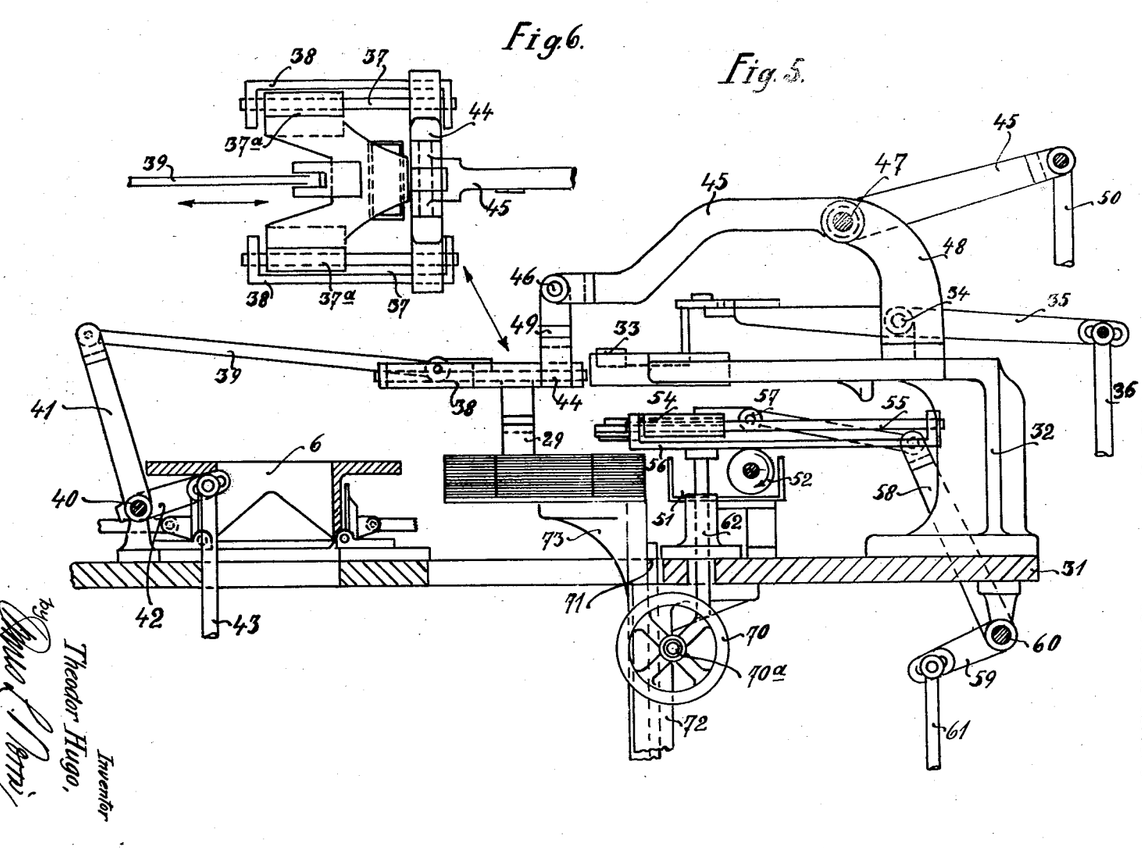
Fig. 5 is a view, partly in section and partly in elevation, of the device for conveying the closing flap gummer and the adhesive material for the lining or covering blank and showing said device as having descended on to the pile of outer cover blanks for the purpose of applying the adhesive material and also showing the folder and the device for gumming the closing flap.
Fig. 6 is a plan view of the guide and plunger for gumming the lining blank in the position corresponding to Fig. 5.
Figure 7:
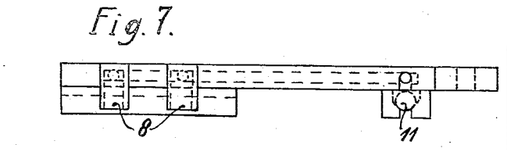
Fig. 7 is a side elevation of one of the suction arms and showing its connection to the suction tube of a circular envelope machine.
Figure 8:
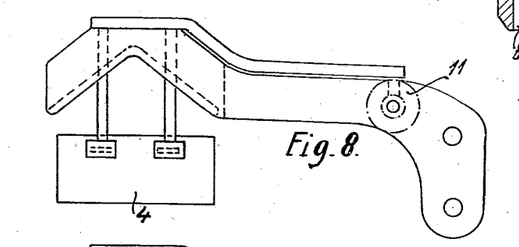
Figs. 8 and 9 are plan views of the arm respectively in position over the pile of lining blanks and over the pile of outer cover blanks.
Figures 9, 11:
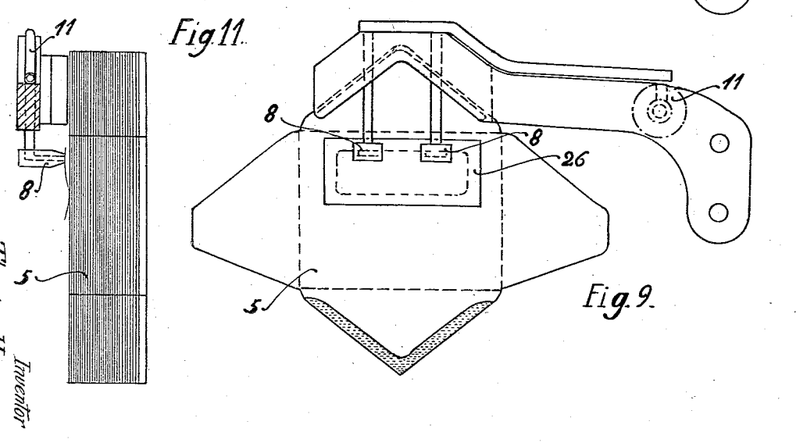
Figs. 10 and 11 are sections corresponding respectively to Figs. 8 and 9.
Figure 10:
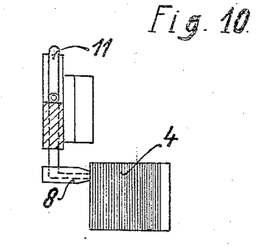
Figure 12:
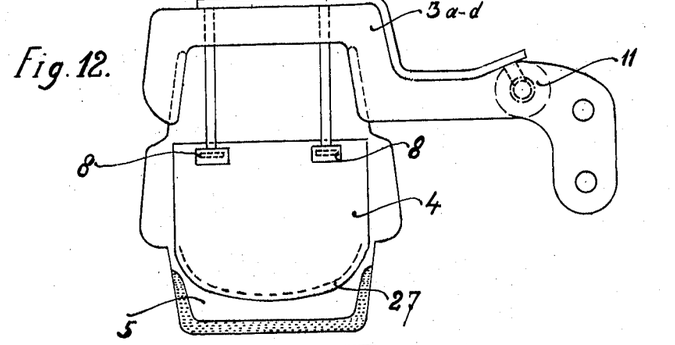
Figs. 12 and 13 are plan views showing the arms over differently shaped partial lining blanks placed on the outer cover blank.
Figure 13:
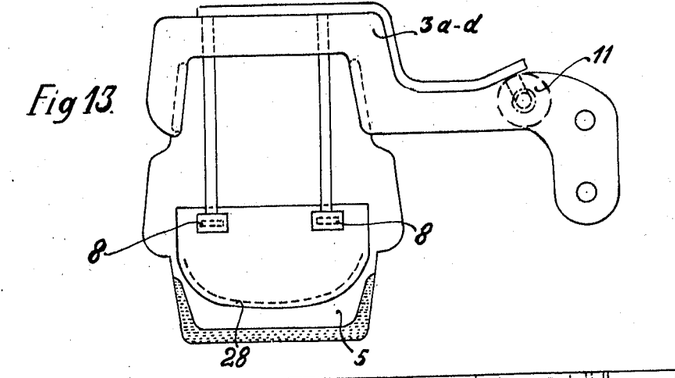

After its ascent the arm 3ª rotates so as to carry the lining blank over the pile 5 of outer blanks, and under the device (Figs. 1, 2, 5 and 6) which applies the adhesive material for sticking the lining blank, and over the device for gumming the closing flap (Figs. 1, 2 and 5). When the arm 3ª arrives at pile 5 it descends with the gripped lining blank to which adhesive has been applied by gummer 9, and lifts same because of the adhesive action of the gummer 9 on its further ascent from the pile 4. The under surface of the lining blank during the descent of the arm is applied to the inner surface of the outer blank which for this purpose has been provided with adhesive material and adheres to the lining blank. The gummed strips on the upper surface of the outer blank are indicated in Fig. 9 for a window envelope by the border 26 with interrupted lines and in Figs. 12 and 13 by the dotted lines 27 and 28. The supply of gum for these adhesive strips is provided by the upper member of the gummer 29 (shown in Fig. 2 in the raised position and shown in Fig. 5 in the lowered position) which receives its adhesive material from a lower gripper 33 and a trough 30, resting on a bracket 32 secured to the machine base plate 31, (Fig. 2). The lower gummer 33 is carried by one end of a lever 35 which is rocked on its pivot 34 by means of a two-armed lever 35 the other end of which lever is actuated by a rod 36 from a cam actuated lever 163ᵇ pivoted at 162′ and actuated by the cam 160ᵇ on the shaft 150 of the machine. The gummer 33 dips into the gum trough 30 and after it has been raised conveys the thin fluid gum to the lower surface of the gummer 29. The gummer 29 slides horizontally on guide rods 37 which are mounted in bearings 38 (Figs. 3, 5 and 6). This movement is effected through the medium of a rod 39 which is moved by a lever 41 pivoted at 40 and which is actuated by a lever 42 and a rod 43 from a cam on the machine.

The bearings 38 are supported by a transverse rod 44 connected to a link 49 which is suspended at 46 from one arm of a two-armed lever 45 (Figs. 1, 2 and 5). The lever 45 rocks on a shaft 47 in a support 48 arranged on the bracket 32. The vertical movements of the gummer 29 with its guides 37ª and 38 are effected by means of the lever 45 which is actuated by a pull rod 50 from a suitably arranged cam lever 50ª journaled on the shaft 162′, and operated from the cam 50ᵇ on the main shaft 150 on the machine.

The apparatus for gumming the closing flap of the uppermost outer cover blank lying on the pile 5 is shown in Figs. 1 and 2. A metal roller 52 rotates in the direction shown by the arrow (Fig. 2) in a gum trough 51 and conveys the adhesive material to the under surface of a closing flap gummer 53 (Fig. 20) carried by guide blocks 54 which move horizontally on horizontal guide rods 55 mounted in a support 56. The movement of the guide blocks 54 is effected by means of links 57, each of which is connected to one end of a lever 58, 59 which is pivoted at 60 and is actuated by a rod 61. The rod 61 is connected with a suitably arranged cam 61ª on the machine and transmits the motion to the guide blocks 54 and gummer 53. The support 56 of the guide blocks 54 is supported by a vertically movable rod 63 guided in a vertical bearing 62. This vertical movement is effected by a cam 63ᵇ actuated by the machine and is so timed that the under surface of the gummer 53 slides in its path from the pile 5 exactly over the periphery of the roller 52, so that the required quantity of adhesive material is supplied. On the return movement of the gummer 53 the support 56 is raised by the rod 63, so that the gum adhering to the gummer 53 on its return to the pile 5 is not reconveyed to the roller 52.

Figure 19:
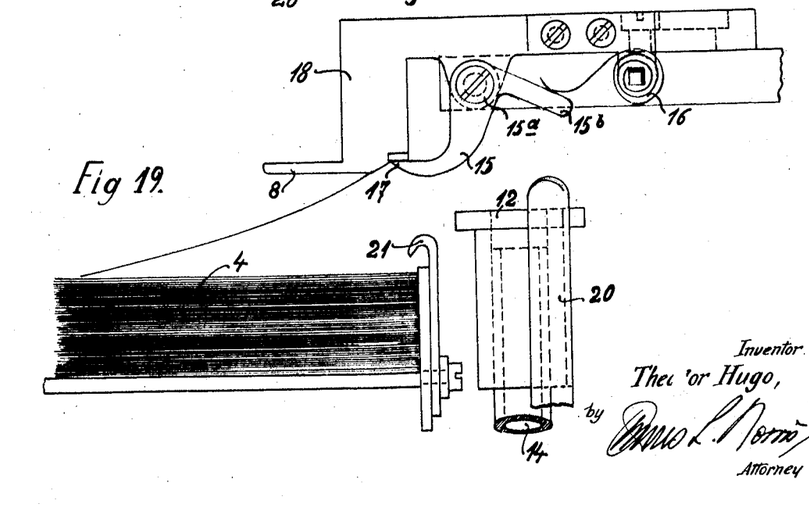
Fig. 19 is a view similar to Fig. 17 but showing a blank being raised from a pile of blanks.

The piles 4 and 5 rest on tables 65 and 73, respectively, (Figs. 1, 2 and 5) which can be moved vertically. The table 65 is moved vertically in guides 64 by a handwheel 66 on a shaft 66ª and a bevel wheel gear 66ᵇ on a shaft 67 provided with toothed wheels 68 engaging in racks 69 which raise or lower the table as required. The table 73 for the pile 5 is in the same manner moved up and down by a hand-wheel 70 on an axle 70ª carrying toothed wheels which engage racks 71 supporting said table and which raise and lower the table 73 in a guide 72. The movement of the uppermost lining blank, which has been raised from the pile 4 with the aid of the hooked gripper device, into position over the uppermost outer cover blank of the pile 5 is effected (Figs. 15–17) by the suction nozzles 8 on the displaceable carrier 18 connected to the suction arms 3ª—3ᵈ, cooperating with the hooked gripping device 15—17. The hooked arm 15, pivoted at 15ª, is pressed by the spring 16 against the fixed cheek 17. An arm 3 arriving over the pile 4 is at first at a certain distance above it (Fig. 17) and is then caused to descend until the nozzles 8 are in contact with the uppermost sheet of the pile (Fig. 18) and then again returns to its original position (Fig. 19). As soon as the arm 3 descends and the lug 15ᵇ of the gripper engages the stationary stop pin 20 on the base plate 31, the arm 15 is rocked on its axis 15ª into the position which is shown in Fig. 18. On the further descent of the arm 3, the hooked arm 15 passes the pile 4 and, on the subsequent rise of the arm 3, returns under the action of the spring 16 to the position shown in Figs. 17 and 19 in which the uppermost lining blank raised by the nozzles 8 is gripped between parts 15 and 17.

To prevent more than one lining blank from being raised at a time a stripping blade 21 (Fig. 18ª) is arranged by the side of the gripper opposite the pile 4 and in known manner retains the blank next below the top blank as soon as this top blank is lifted.

Figure 15:
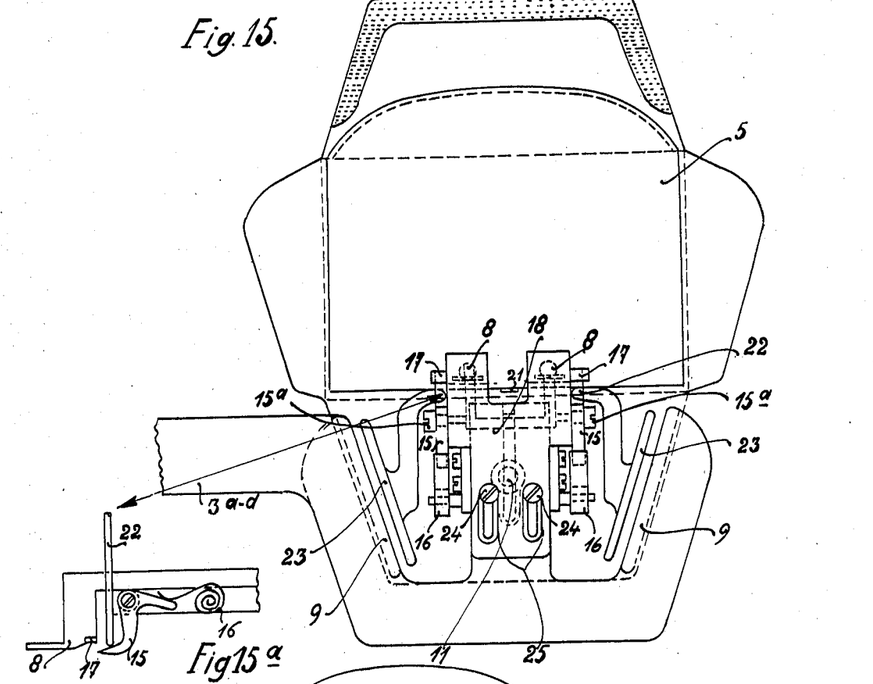
Fig. 15 is a plan of a suction arm and a gripping device for the lining blank in position over the pile of outer cover blanks.
Figure 16:
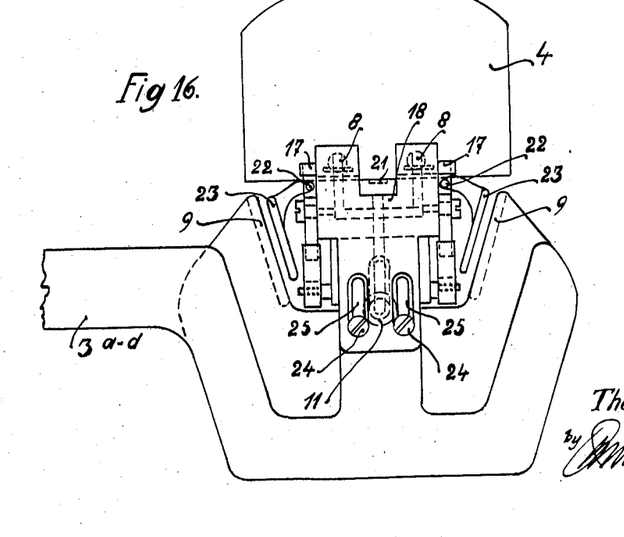
Fig. 16 is a plan view of the same parts illustrated in Fig. 15 over the pile of lining blanks.
Figures 17, 17A, 18, 18A:
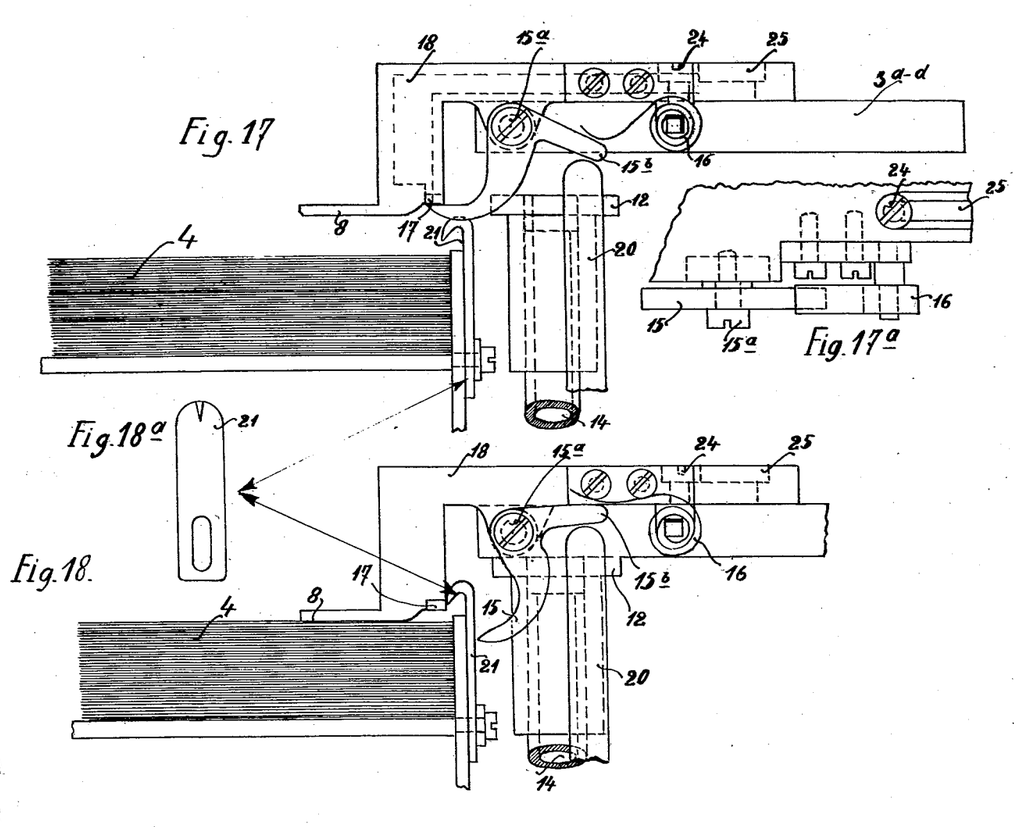
Fig. 17 is an elevation of the suction arms the gripper being shown in position over the pile of lining blanks with the hooked arm closed.
Fig. 18 is a view similar to Fig. 17 but showing the hooked arm in open position.

Figs. 15, 16 and 17ª are plan views of the gripping device on the arms 3ª, 3ᵇ, 3ᶜ and 3ᵈ, from which it is seen that the carrier 18 for the nozzles 8 and for the grippers 15 are adjustable in slots 25 and can be clamped by screws 24 on said arms.

Each gripper 15 is again opened, when the arm which carries it is over the folding device 6, by a pin 22 which is moved vertically in a carrier 23. The pins 2 are actuated by cams operated by the machine (Figs. 15, 15ª and 16) and each of them engages the arm 15 of the gripper to move such arm away from the projection 17 so that the lining blank can be released.

The air suction tube 11 (Figs. 15 and 16) connected with the nozzles 8 is not displaced by the adjustment of the support 18, but always remains over the coupling member 12. In order to prevent the entrance of atmospheric air, a packing is inserted in known manner between the support 18 and the gummer arm 9. Each arm 3 carries in addition to the suction nozzles and the gripping device, a gummer 9 for the under flap of the envelope which also serves for lifting the outer cover blanks from the pile 5 and at the same time transmits adhesive material for gumming the under flap.

The lifting of the lining blank from the pile 4 by means of the arms 3ª—3ᵈ and the gripping device (Figs. 13–19) can also be effected by an arrangement in which the uppermost lining blank is exposed to the action of suction nozzles disposed permanently over the pile 4 and raised or lowered vertically as required. In Fig. 14ª the nozzles 8 are shown in elevation in the position in which they have directly raised a lining blank which has been gripped and held by the members 15 and 17.

The nozzles 8 are moved vertically by a suction tube 8ª, which is connected to the suction pump of the machine. The suction tube 8ª is carried by a guide block 75 movable on a guide 74. A bolt 76 on the guide block 75 is moved vertically by levers 77 and 79 on a shaft 78 and a rod 80 which engages the lever 79 and is actuated from a cam driven by the machine. The shaft 78 is mounted in a support 81 on a bracket 82 secured to the base plate 31. The lifting, gripping and feeding of the blanks is effected in the manner already described in connection with the arms 3ª—3ᵈ when the latter are provided with directly attached suction nozzles.

Figure 20:
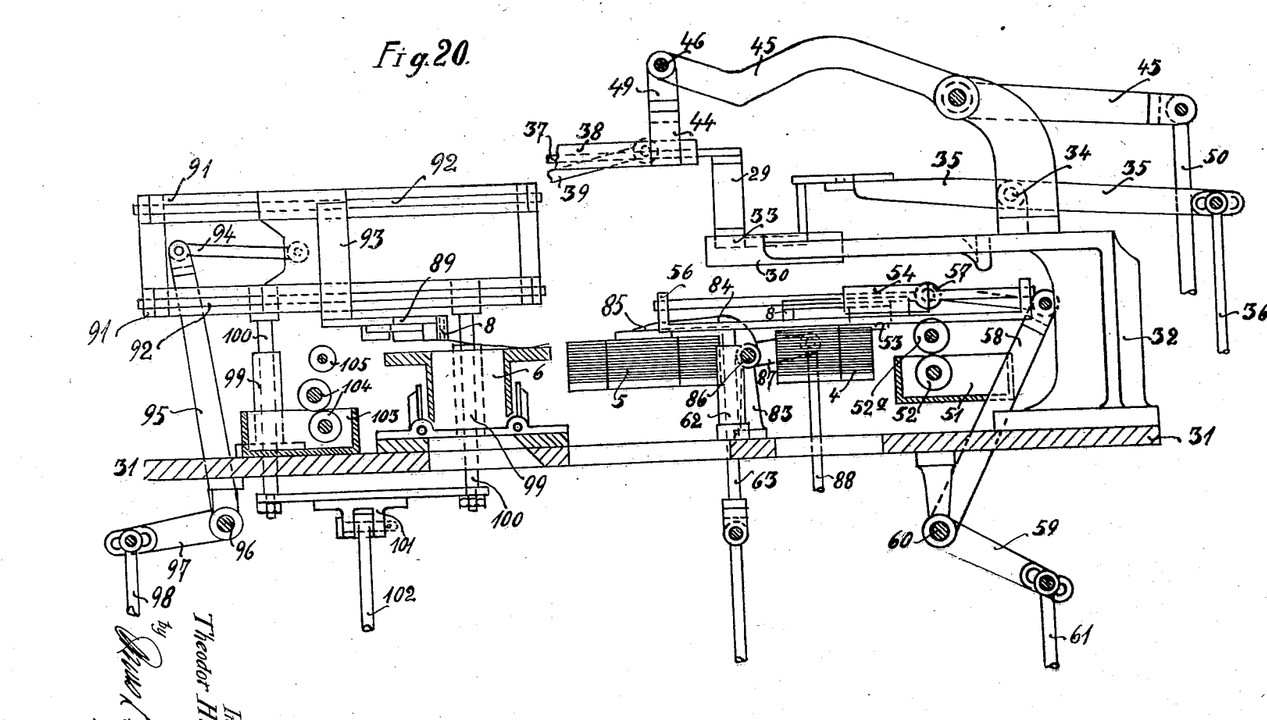
Fig. 20 is an elevation of a suction machine wherein the lining blanks are moved rectilinearly from the piles to the folder, the gum trough for the closing flaps, the pile of blanks, the folder and the gum trough for the under flap of the envelope being shown in cross section.
Figure 21:
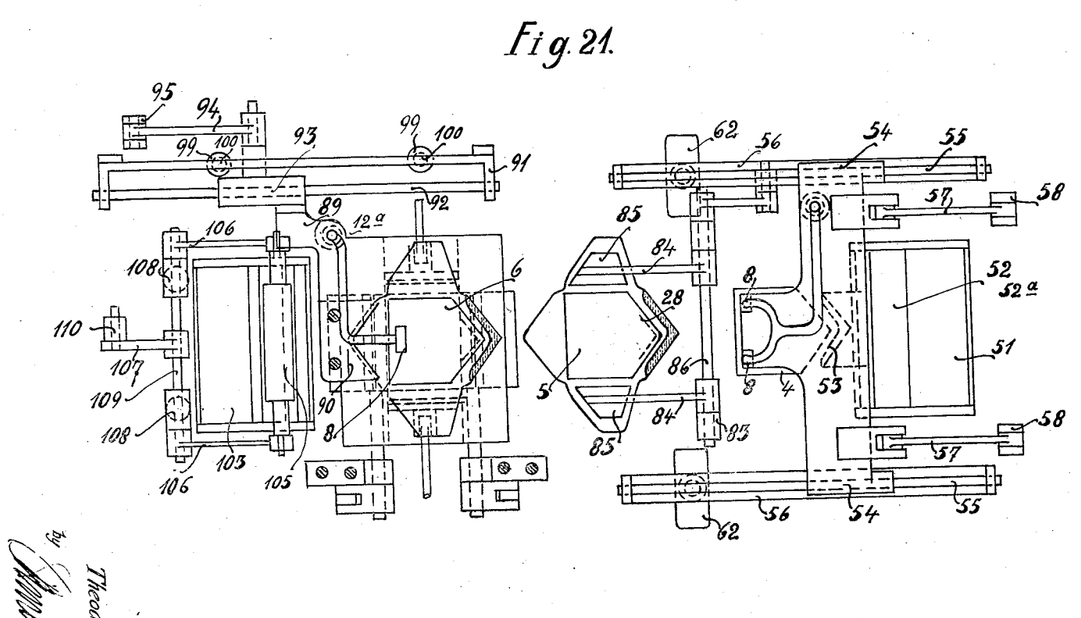
Fig. 21 is a plan view corresponding to Fig. 20.

A further modification of the apparatus is shown in Figs. 20 and 21. In this case the conveyance of the blank from the pile 4 to the pile 5 and thence to the folding device 6 is effected in a rectilinear instead of in a circular path.

On guiding rods 55 horizontally mounted in supports 56 slide guides 54 which carry the suction nozzles and also move the gumming device 53 for the closing flaps horizontally to and fro. The supports 56 are moved vertically by guide rods 63 movable in the vertical bearing 62 mounted on the base plate 31 and actuated by suitable cams operated by the machine. The movement of the guides 54, of the nozzles 8 and of the gummers 53 is effected in the manner previously described in connection with the circular machine. The gummer 53 in this embodiment of the invention slides over a roller 52ª which, by means of a roller 52, transfers the adhesive material from a trough 51 to the gummer 53. The horizontal to and fro movement of the guides 54 is effected by means of an intermediate lever 59 through a lever 57 and a lever 58 which oscillates about a pivot 60. The lever 59 is connected by a pull rod 61 to a cam operated by the machine. As the guide 54 moves from right to left (Figs. 20 and 21), the closing flap gumming device 53 first receives its adhesive material from the roller 52 and the suction nozzles 8 raise the uppermost lining blank from the pile 4. The gummer 53 and nozzles 8 with the lining blank adhering thereto are moved horizontally towards the pile 5, whereupon a plunger 85 connected to a lever 84 pivoted on a shaft 86 mounted in bearings 83 releases the lining blank from the nozzles 8 and the blank is pressed down on the uppermost outer cover blank. The lever 85 is actuated by an intermediate lever 87 and a pull rod 88 operated from the machine by suitable means. Simultaneously with this action the gummer 53 gums the outer cover blank. Before the lining blank is removed from the pile 5 and transported to the pile 6, in the manner described in connection with the circular envelope machine, the adhesive strips 28 (Fig. 21) are applied by means of the co-operating upper gummer 29 and lower gummer 33. The gummer 33 receives its adhesive material from the trough 30 and its movement is effected by the two-armed lever 35 pivoted at 34 and actuated through the pull rod 36 by a cam 160 on the machine. The upper gummer 29 is reciprocated by a lever 39 working in guides 38 in which are mounted horizontally guided rods 37. The guides 38 are carried by an arm 44 and a link 49 connected at 46 to one arm of a two-armed lever 45 which is rocked about a pivot 47 by the cam 50$^b$ on the shaft 150 of a pull rod 50 actuated by the machine.

After the lining blank has been placed on the outer sheet pile 5 in the manner described, the two blanks are lifted and led to the folding device by means of a second suction arm 89 and the suction nozzles 8 on this arm, a gummer 90 for the under flap of the envelope being also brought into action. The arm 89 is reciprocated by a slide block 93 mounted on horizontal guide rods 92 in carriers 91. The slide block 93 is reciprocated by means of a link 94 and a lever 95 which rocks about a pivot 96 under the action of a lever 97 connected to a pull rod 98 operated by the machine.

The suction arm 89, the lower gummer 90, the guide rods 92 and carrier 91 are moved vertically by rods 100 mounted in vertical bearings 99 provided on the base plate 31. The rods 100 are reciprocated through a transverse member 101 by a pull rod 102 driven from a cam on the machine. The lower gummer 90 receives its adhesive material from a trough 103 by means of metal rollers 104 from which in known manner by means of a roller 105 the gum is lifted and is transmitted to the lower surface of the lower gumming device 90. The roller 105 is suitably oscillated by lever arms 106 and 107 secured to a shaft 109 mounted in bearings 108 by means of a pull rod 110 actuated by the machine.

The action of the air suction pump connected to the machine, of the suction nozzles 8 over the pile of lining blanks, and of the devices which lead the blanks from the sheet pile to the folding device, is essentially the same as that previously described in connection with the circular machine, the guides 54 or 93 on their downward movement coming into engagement with the coupling members 12 or 12$^a$.

Figure 22:
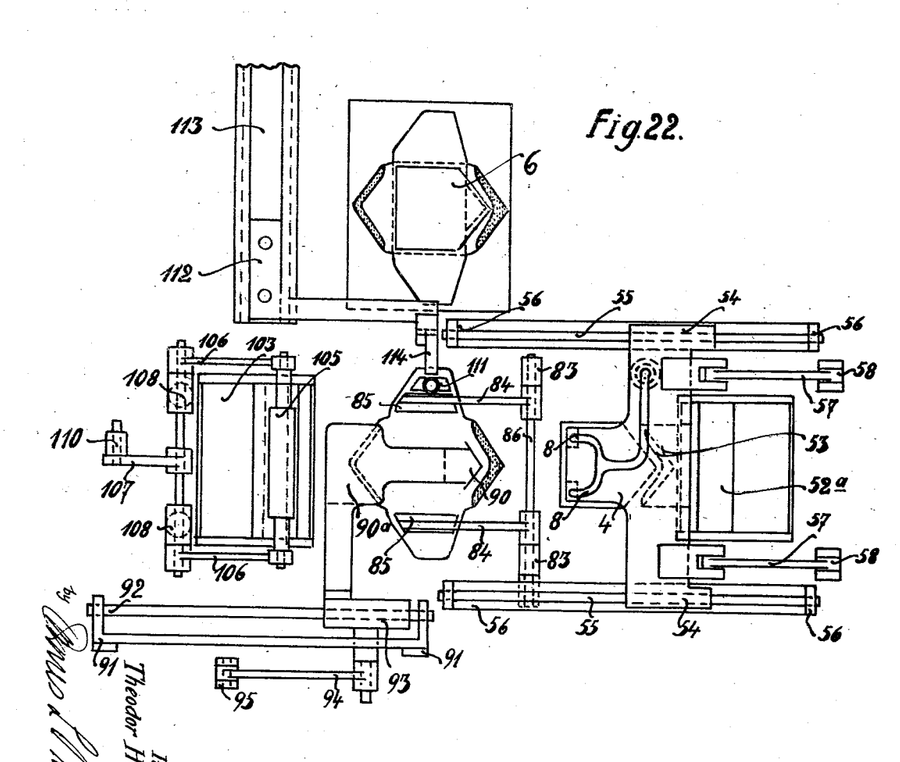
Fig. 22 shows the mechanism (gumming devices, pile of blanks, feeding and folding devices) of a suction machine, in which the lining blanks are fed in a rectilinear path to the pile of outer cover blanks and the two blanks are then conveyed in a direction at right angles to the path of the lining blanks.

A further modification which is similar to that previously described and only differs from it in the arrangement of the folding device in relation to the two piles of blanks, is shown in Fig. 22.

The operation so far as it relates to the movement of the lining blank and the attachment of the latter to the outer cover blank, is effected exactly as described in Figs. 20 and 21. Also, the conveyance of the adhesive material to the lower gumming device is effected in this example as described in connection with Figs. 20 and 21, the lower gummer 90 being reciprocated horizontally by the slide block 93. The slide block 93 is moved on guide rods 92 which are secured in the carriers 91. The movement itself is transmitted by means of the levers 94 and 95 to the slide block 93 and is effected by a cam actuated by the machine. The lower gummer 90 is connected with its guide 93 by an arm 90$^a$.

As soon as a double blank has been formed by the union of the lining blank with the outer blank, this is, in the construction shown in Fig. 22, lifted by the nozzles 111 and is carried by means of a slide block 112. sliding in a guide 113 and a horizontally reciprocating hook 114 to the folding device 6, where it is deposited in known manner and is folded by a plunger and a folding device and gummed down.

Figure 23:
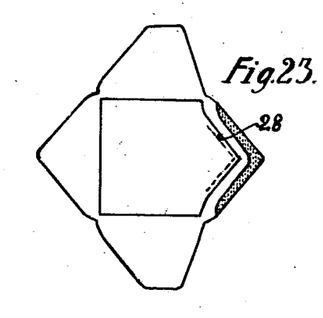
Fig. 23 is a plan view of a partial lining blank and Fig. 23ª is a plan view of a window blank.
Figure 23A:
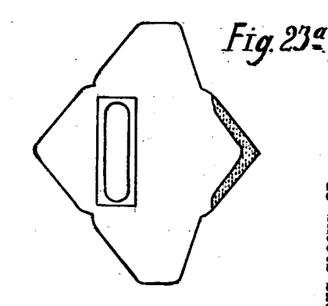

Fig. 23 represents an outer cover blank having a partial lining blank held upon it by the gumming strips 28.

Fig. 23$^a$ shows an outer cover blank with a window blank fastened on it.

Having now particularly described and ascertained the nature of my said invention and in what manner the same is to be performed, I declare that what I claim is:—

1. A machine of the class described, comprising means for supporting a pile of envelope lining blanks, means for supporting a pile of envelope blanks, means for applying to the upper side of the uppermost envelope blank a line of adhesive conforming to the shape of the lining blanks, means for applying adhesive to the closing flap of the envelope blank, means for folding envelope blanks, a member movable over said piles of blanks and folding means, said member having means for lifting a lining blank from said first-named pile and transporting it over and depositing it upon the upper side of the uppermost envelope blank, said movable member also having associated therewith means for applying adhesive to the closing flap of the envelope blank simultaneously with the deposit of a lining blank thereon and being caused by the adhesive applied thereby to adhere to the envelope blank and transport said blank during the further movement of said movable means to said folding means, said first-named adhesive applying means, the second-named adhesive applying means, the movable member, and the folding means being operable in the order just set forth.

2. A machine according to claim 1 wherein the movable member has movement toward and away from the support for the pile of lining blanks, and has associated therewith a gripper operable in the downward movement of said member toward said pile of lining blanks to grip the uppermost blank of said pile, said member being then movable upwardly and over the pile of envelope blanks, then downwardly to deposit said lining blank upon the uppermost envelope blank, then upwardly and over the folding means and then downwardly to deliver the envelope blank and the lining blank adhering thereto to said folding means.

3. A machine according to claim 1 wherein the movable member has movement first downwardly toward the pile of lining blanks, then upwardly and over the pile of envelope blanks, then downwardly over the latter pile, then upwardly and over the folding means, and then downwardly over the folding means, and wherein said member has a gripper associated therewith operable in the downward movement of said member over the pile of lining blanks to grip the uppermost lining blank and in the downward movement of said member over said folding means to release said blank.

4. A machine of the class described comprising means for supporting a pile of envelope lining blanks, means for supporting a pile of envelope blanks, an envelope folding means, an arm movable over and also toward and away from said piles and said folding means, means carried by said arm for gripping a blank in said first-named pile during the movement of said arm toward said pile, means for applying adhesive to the uppermost blank of said pile of envelope blanks to cause an envelope lining blank to adhere thereto when deposited thereon by said arm, means carried by said arm for applying adhesive to the closing flap of one of said envelope blanks simultaneously with the application of a lining blank thereto, and means for releasing said gripping means when the envelope blank is deposited in said folding means.

5. A machine of the class described, comprising a support for a pile of envelope lining blanks, a support for a pile of envelope blanks, and envelope folding means, a plurality of arms rotatable step by step over said piles and folding means and also movable and away from said piles and folding means, means for applying adhesive to the uppermost envelope blank to cause a lining blank to adhere thereto when deposited thereon, a gripper carried by each of said arms and operable in the movement of its arm toward said first-named pile to grip a blank from said pile and in the further movement of said arm deposit said blank upon the uppermost blank in said pile of envelope blanks, means carried by each of said arms for applying adhesive to the closing flap of one of the envelope blanks simultaneously with the deposit of a lining blank thereon and to which such blank adheres in the further movement of said arm until said arm is over said folding means, and means operable by the deposit of said envelope blank by said arm upon the folding means for releasing said gripper.

In testimony whereof I have affixed my signature.

THEODOR HUGO.